United States Patent Office 3,618,323
Patented Nov. 9, 1971

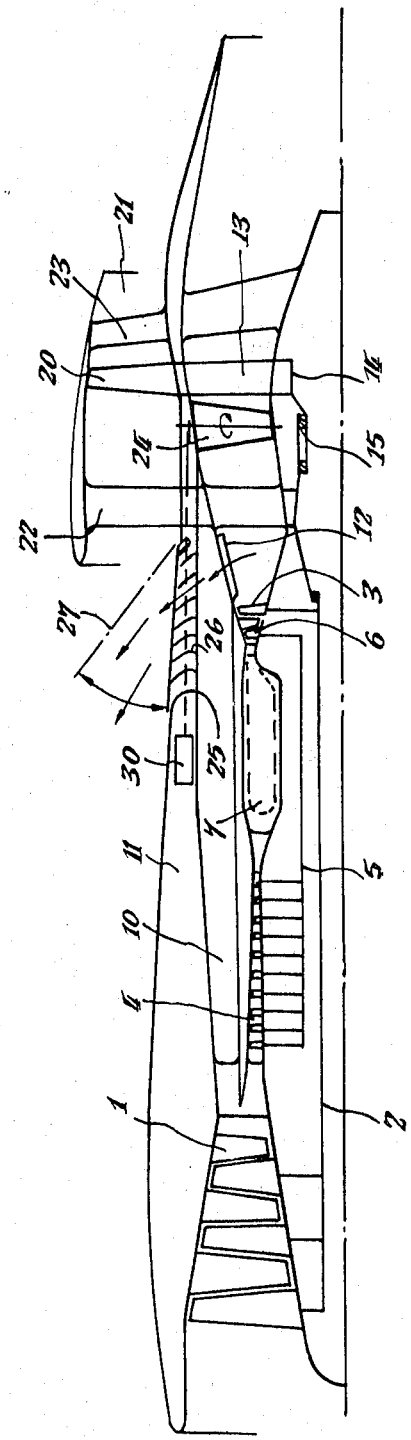

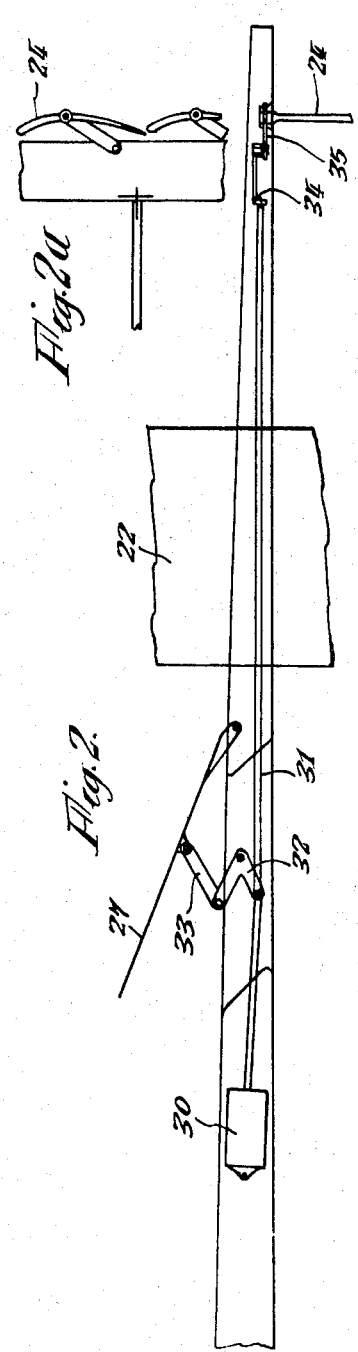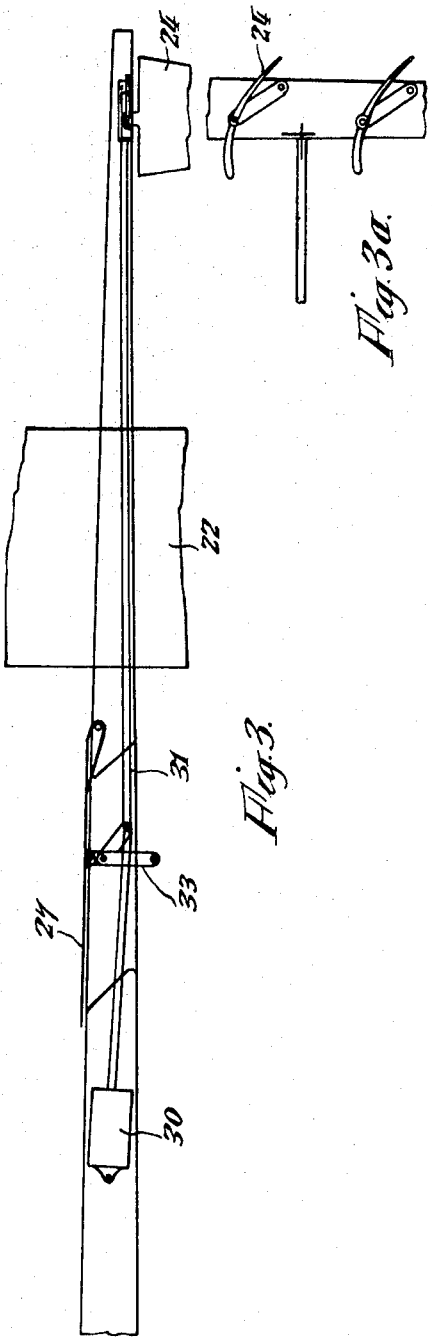

3,618,323
COMBINED FAN TURBINE FLOW CONTROL AND THRUST REVERSING MEANS
Peter Richard Needham, Filton, Bristol, England, assignor to Rolls-Royce Limited, Derby, England
Filed Sept. 8, 1969, Ser. No. 855,848
Claims priority, application Great Britain, Sept. 14, 1968, 43,822/68
Int. Cl. F02k 1/20, 3/02
U.S. Cl. 60—228                                 6 Claims

ABSTRACT OF THE DISCLOSURE

Apparatus for reversing the thrust of an aft fan engine consists of a ring of pivotable vanes which can be pivoted to close off the flow through the fan-driving turbine simultaneously with the opening of thrust reversing outlets in the engine casing upstream of the vanes. The fan will windmill in the mainstream and provide additional drag on the aircraft eliminating the need for fan-thrust reversers.

---

The present invention relates to gas turbine jet propulsion engines and has particular reference to engines of the ducted fan type.

It is an object of the present invention to provide a thrust reversing means for an engine which has a turbine driven fan.

According to one aspect of the present invention a gas turbine jet propulsion engine for an aircraft is provided with a turbine-driven fan, means for closing off the flow or flow path through the fan driving turbine and simultaneously opening outlets in the engine casing, whereby the gases which normally pass through the fan-driving turbine are deflected through the outlets.

The fan thrust will be reduced substantially to zero and the fan will windmill in the free air stream due to forward motion of the aircraft. This windmilling will cause a drag on the aircraft which is additional to the braking effect of the reverse thrust. There is no necessity therefore, for using additional or larger thrust reversers for reversing the fan thrust and the thrust reversing system is thus correspondingly lighter.

A further weight advantage can be obtained if vanes upstream of the fan driving turbine are used instead of the conventional thrust reverser buckets, and the vanes are pivoted between positions in which the flow through the fan-driving turbine is substantially unimpeded or blocked, and means are provided for simultaneously closing and opening the thrust reversing outlets respectively.

According, therefore, to a feature of the present invention a gas turbine jet propulsion engine is provided with a turbine driven fan, vanes at the inlet of the fan-driving turbine and means for pivoting the vanes about their longitudinal axes, thrust reversing outlets in the engine casing which are normally closed, means for opening the thrust reversing outlets to provide reverse thrust, and for simultaneously pivoting the vanes to close off the flow through the fan turbine. In a preferred embodiment the vanes also constitute inlet guide vanes for the fan-driving turbine.

The fan may be mounted at the front or at the rear of the engine and is preferably surrounded by a cowl.

In one embodiment of the invention the fan is an aft fan and the thrust reverser outlets are upstream of the fan. The fan can therefore be mounted on the engine as a separate unit.

Preferably the gas turbine engine is a by-pass engine and the fan provides an additional by-pass stream outside the engine case.

The thrust reverser outlets may be provided in the form of a cascade of vanes in the by-pass duct casing and are covered, when not in use, by a translatable shroud alternatively, or in addition, the thrust reverser outlets may be closed by doors pivoted at their rearmost ends. By this means the forward component of the gas exit velocity from the outlets can be varied by opening the doors to any desired angle.

The invention will now be described in more detail, merely by way of example, with reference to the accompanying drawings in which:

FIG. 1 is a cross-sectional elevation of a preferred gas turbine engine according to the invention, FIG. 2 illustrates a linkage mechanism suitable for operating the thrust reverser showing the thrust reverser outlet open.

FIG. 2a illustrates the inlet guide vanes in their closed position,

FIG. 3 illustrates the linkage which the thrust reverser in its normal closed position, and FIG. 3a illustrates the inlet guide vanes in their open position. FIGS. 2 and 3 are diagrammatic only.

Referring now to the drawings there is shown in FIG. 1 a gas turbine jet propulsion engine for use in an aircraft (not shown), the engine being of the by-pass type and having a low pressure (L.P.) compressor 1 which is drivingly connected by means of an L.P. shaft 2 to an L.P. turbine 3, and a high pressure (H.P.) compressor 4 which is drivingly connected by means of an H.P. shaft 5 to an H.P. turbine 6. The compressors 1 and 4 supply compressed air to a combustion chamber 7 where it is burned and from which the hot gases pass to the turbines 6 and 3.

Part of the air compressed by the L.P. compressor passes into a by-pass duct 10 the outer wall 11 of which forms the outer casing of the engine. The air flowing in the by-pass duct by-passes the H.P. compressor, the combustion chamber and the two turbines and is mixed with the hot gases from the L.P. turbine downstream thereof by means of a mixing device 12.

Downstream of the mixing device 12 is disposed a fan-driving turbine 13 mounted for rotation on a shaft 14 and overhung from bearings 15. The fan comprises a plurality of blades 20 mounted on the turbine 13 radially outwardly thereof, and which rotate in a duct 21. The duct is supported from the engine casing by a plurality of struts 22 and 23.

A ring of inlet guide vanes 24 is provided upstream of the fan-driving turbine 13. The guide vanes are mounted for rotation about their longitudinal axes by means of an actuating mechanisms 30 shown in FIG. 2.

In the outer wall 11 of the by-pass duct are a pair of symmetrically disposed thrust reverser outlets 25 in each of which is mounted a cascade of vanes 26. The vanes 26 are arranged to turn any flow through the thrust reverser outlets to give said flow a substantial forward component to provide a braking effect on an aircraft. The outlets 25 are closed by doors 27 during the normal forward thrust mode of operation of the engine and when thrust reverse is required the doors, which are pivoted at their rearmost ends are opened, by the actuator mechanism 30.

In this embodiment the actuator mechanism, which may be operated in any suitable manner, for example, electrically, pneumatically or hydraulically, is connected so as to simultaneously open the thrust reverser doors 27 and to pivot the vanes 24 to close off the flow of gases through the flow path to the fan driving turbine 13. Thus the hot gases are deflected through the thrust reverser outlets 25. It may be desired however to rotate the inlet guide vanes to vary their pitch angle for controlling the speed of rotation of the fan, in which case a lost motion system must be introduced into the actuating mechanism 30 to prevent the thust reverser doors opening unless the guide vanes are to be fully closed.

The actuator system is shown in more detail in FIGS. 2 and 3.

The actuator 30 causes longitudinal movement of an actuator rod 31. The rod 31 is connected by one set of pivoted levers 32, 33 to the doors 27, and by a further set of levers 34, 35 to inlet guide vanes 24 so that movement of the rod simultaneously opens the thrust reverser doors and turns the guide vanes to block the flow through the fan-driving turbine 13.

FIGS. 2 and 2a show the doors 27 open and the guide vanes closed. FIGS. 3 and 3a show the doors 27 closed and the guide vanes open.

By blocking the flow through the fan-driving turbine the fan will rotate only because there is a flow of air through it due to the forward movement of the aircraft. Therefore the loss of braking effect obtainable due to the loss of fan thrust is made up, at least in part, by the additional drag of the rotating fan.

The thrust reverser can therefore be made much smaller since it has to deal only with the flow of gases through the compressors and the by-pass duct.

In the preferred embodiment where the conventional pivoting thrust reversing buckets are replaced by rotatable inlet guide vanes on the fan turbine and a cascade of vanes in the by-pass duct, this together with the shortening in length of the engine decreases the overall weight of the engine.

Further, by keeping the thrust reverser upstream of the fan, the fan can be fitted as an additional complete unit.

Obviously these latter advantages are not available in a front fan system, but the main advantage of a smaller thrust reverser unit needed because the fan thrust is not reversed is still present.

The preferred embodiment is described as a by-pass engine but the invention is equally applicable to non by-pass engines to which a fan is added.

If the inlet guide vanes for the fan-driving turbine are such a shape that they do not fully close the flow through the turbine when thrust reverse is required, they may be pivoted to such an extent that any leakage is directed onto the turbine blades in such a direction as to try to drive the fan in the reverse direction. This will at least prevent any forward thrust being produced by the fan and will cause the fan to produce additional drag on the aircraft.

If the inlet guide vanes for the fan turbine are not suitable for use as pivotable vanes an additional ring of vanes may be used.

Separate actuating mechanisms may be used if it is desired to have control over the fan speed so that the vanes may be pivoted independently of the thrust reverser for this purpose.

If cascades are used they may be made pivotable to close off the thrust reverse outlet and the doors may be dispensed with.

I claim:

1. A gas turbine jet propulsion engine for an aircraft comprising an engine casing, a fan, a fan-driving turbine, a gas flow path through said fan-driving turbine, and means for closing off the flow path through the fan-driving turbine, and simultaneously opening outlets in the engine casing, whereby the gases which normally pass through the fan-driving turbine are deflected through the outlets.

2. A gas turbine engine according to claim 1 and wherein the outlets in the casing are provided with means for deflecting the effluent gases forwardly to provide reverse thrust.

3. A gas turbine engine according to claim 2 and wherein the outlets in the casing are normally closed by doors which are pivotable about their downstream ends to a position in which the outlets are opened and the doors deflect effluent gases forwardly.

4. A gas turbine engine according to claim 1 and wherein the means for closing off the flow path through the fan-driving turbine comprises a ring of vanes at the inlet to said turbine, and means for pivoting the vanes about their longitudinal axes.

5. A gas turbine engine according to claim 1 and wherein the fan is an aft fan.

6. A gas turbine engine according to claim 1 and wherein the gas turbine engine is a by-pass engine.

References Cited
UNITED STATES PATENTS

| | | | |
|---|---|---|---|
| 3,344,604 | 10/1967 | Mattia | 60—229 |
| 3,475,913 | 11/1969 | Mortlock | 60—229 |
| 3,483,702 | 12/1969 | Ward | 60—229 |
| 3,492,821 | 2/1970 | Monaghan | 60—229 |

CLARENCE R. GORDON, Primary Examiner

U.S. Cl. X.R.
60—226, 230, 39.16